United States Patent
Ghil et al.

(10) Patent No.: US 10,749,198 B2
(45) Date of Patent: Aug. 18, 2020

(54) METHOD FOR PREPARING MEMBRANE-ELECTRODE ASSEMBLY, MEMBRANE-ELECTRODE ASSEMBLY PREPARED THEREFROM, AND FUEL CELL COMPRISING SAME

(71) Applicant: LG CHEM, LTD., Seoul (KR)

(72) Inventors: Lee Jin Ghil, Daejeon (KR); Hyuk Kim, Daejeon (KR); Sangwoo Lee, Daejeon (KR); Doyoung Kim, Daejeon (KR); Minju Choo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/082,845

(22) PCT Filed: Sep. 20, 2017

(86) PCT No.: PCT/KR2017/010319
§ 371 (c)(1),
(2) Date: Sep. 6, 2018

(87) PCT Pub. No.: WO2018/101591
PCT Pub. Date: Jun. 7, 2018

(65) Prior Publication Data
US 2019/0074533 A1 Mar. 7, 2019

(30) Foreign Application Priority Data
Nov. 30, 2016 (KR) .................. 10-2016-0161995

(51) Int. Cl.
*H01M 8/1004* (2016.01)
*H01M 4/88* (2006.01)
(Continued)

(52) U.S. Cl.
CPC ....... *H01M 8/1004* (2013.01); *H01M 4/8652* (2013.01); *H01M 4/8668* (2013.01);
(Continued)

(58) Field of Classification Search
CPC ............. H01M 8/1004; H01M 8/1018; H01M 4/8652; H01M 4/8668; H01M 4/8803;
(Continued)

(56) References Cited

U.S. PATENT DOCUMENTS 7,419,740 B2 * 9/2008 Binder .................. H01M 4/881
429/479
7,960,073 B2 * 6/2011 Park .................... H01M 4/8605
429/523
(Continued)

FOREIGN PATENT DOCUMENTS

JP 2008-181845 A 8/2008
KR 10-2007-0056760 A 6/2007
(Continued)

OTHER PUBLICATIONS

International Search Report for PCT/KR2017/010319 dated Mar. 27, 2018.
(Continued)

*Primary Examiner* — Brian K Talbot
(74) *Attorney, Agent, or Firm* — Birch, Stewart, Kolasch & Birch, LLP (57) ABSTRACT

The present specification relates to a method for manufacturing a membrane-electrode assembly, a membrane-electrode assembly manufactured using the same, and a fuel cell comprising the same.

6 Claims, 7 Drawing Sheets

(51) Int. Cl.
*H01M 4/92* (2006.01)
*H01M 4/86* (2006.01)
*H01M 8/1018* (2016.01)

(52) U.S. Cl.
CPC ....... *H01M 4/8803* (2013.01); *H01M 4/8828* (2013.01); *H01M 4/8882* (2013.01); *H01M 4/926* (2013.01); *H01M 8/1018* (2013.01); *Y02E 60/523* (2013.01); *Y02P 70/56* (2015.11)

(58) Field of Classification Search
CPC .. H01M 4/8828; H01M 4/8882; H01M 4/926; Y02E 60/523
USPC .......................................... 427/115
See application file for complete search history.

(56) References Cited

U.S. PATENT DOCUMENTS

| | | | | |
|---|---|---|---|---|
| 9,325,023 | B2 * | 4/2016 | Hong | H01M 4/8814 |
| 2005/0200040 | A1 * | 9/2005 | Hara | H01M 4/8807 |
| | | | | 264/104 |
| 2007/0122688 | A1 | 5/2007 | Park et al. | |
| 2008/0160351 | A1 * | 7/2008 | Felix | C08J 3/05 |
| | | | | 429/483 |
| 2009/0117438 | A1 * | 5/2009 | Saito | C08J 5/2256 |
| | | | | 429/493 |
| 2010/0021777 | A1 * | 1/2010 | Gottesfeld | H01M 8/0289 |
| | | | | 429/429 |
| 2010/0086821 | A1 * | 4/2010 | Kwon | H01M 4/8814 |
| | | | | 429/457 |
| 2011/0118110 | A1 * | 5/2011 | Kotrel | B01J 23/89 |
| | | | | 502/184 |
| 2012/0208106 | A1 * | 8/2012 | Dale | H01M 4/8807 |
| | | | | 429/534 |
| 2013/0052560 | A1 * | 2/2013 | Kawaji | H01M 8/1009 |
| | | | | 429/482 |
| 2013/0157169 | A1 | 6/2013 | Madden et al. | |
| 2013/0280642 | A1 * | 10/2013 | Gummalla | C08J 5/22 |
| | | | | 429/492 |
| 2014/0377685 | A1 * | 12/2014 | Hong | H01M 4/8814 |
| | | | | 429/492 |

FOREIGN PATENT DOCUMENTS

| | | |
|---|---|---|
| KR | 10-2011-0114992 A | 10/2011 |
| KR | 10-2011-0122915 A | 11/2011 |
| KR | 10-2013-0050154 A | 5/2013 |
| KR | 10-2014-0131815 A | 11/2014 |
| WO | WO 2012/153915 A2 | 11/2012 |

OTHER PUBLICATIONS

Extended European Search Report dated Feb. 18, 2019, for European Application No. 17875980.9.

\* cited by examiner

METHOD FOR PREPARING MEMBRANE-ELECTRODE ASSEMBLY, MEMBRANE-ELECTRODE ASSEMBLY PREPARED THEREFROM, AND FUEL CELL COMPRISING SAME

TECHNICAL FIELD

The present specification claims priority to and the benefits of Korean Patent Application No. 10-2016-0161995, filed with the Korean Intellectual Property Office on Nov. 30, 2016, the entire contents of which are incorporated herein by reference.

The present specification relates to a method for manufacturing a membrane-electrode assembly, a membrane-electrode assembly manufactured using the same, and a fuel cell comprising the same.

BACKGROUND ART

A fuel cell is a power generating system directly converting chemical reaction energy of hydrogen and oxygen included in hydrocarbon-based materials such as methanol, ethanol, and natural gas to electric energy by an electrochemical reaction.

Typical examples of such a fuel cell may include a polymer electrolyte membrane fuel cell (PEMFC) or a direct methanol fuel cell (DMFC) using methanol as fuel, and the like, and developments and researches thereon have been actively progressed.

Particularly, a polymer electrolyte membrane fuel cell (PEMFC) has been accepted as a clean and efficient energy conversion system capable of being used as a movable or fixed power supply due to advantages such that a working temperature is not high, energy density is high, corrosivity is small and handling is simple.

A fuel cell system may be formed with, for example, a continuous composite of a membrane-electrode assembly (MEA), a bipolar plate collecting generated electricity and supplying fuel, and the like.

A membrane-electrode assembly is made by forming an electrode through coating a catalyst layer on an electrolyte membrane, and generally, a method of spraying catalyst slurry prepared by placing an ionomer and a catalyst in a solvent, then stirring and dispersing the result, a method of coating catalyst slurry and the like on a support first, and then transferring a produced catalyst layer on a polymer electrolyte membrane, or the like, may be used.

In order to enhance fuel cell performance, dispersibility of a catalyst and ionomer particles for a solvent is important, and direct dispersion (ball mill, bid mill or the like) and indirect dispersion (sonication), existing methods of dispersing a catalyst, have a problem in that dispersion is difficult due to problems such as aggregation when using an acetyl carbon black-based catalyst or a catalyst having a low Pt content.

In addition, a most important point in optimizing a catalyst layer structure is optimizing a tri-phase network structure of pores, a catalyst and an ionomer by the ionomer linking the catalyst particles, and with existing dispersion methods, the ionomer may be attached to the catalyst lump or readily crowded on one side, and cracks occur making the pore structure unstable leading to performance decline.

Accordingly, development of a membrane-electrode assembly capable of enhancing fuel cell performance by securing pore structure stability through highly dispersible catalyst slurry and maximally suppressing a crack phenomenon has been continuously required.

DISCLOSURE

Technical Problem

The present specification is directed to providing a method for manufacturing a membrane-electrode assembly, a membrane-electrode assembly manufactured using the same, and a fuel cell comprising the same.

Technical Solution

One embodiment of the present specification provides a method for manufacturing a membrane-electrode assembly (MEA) comprising (a) preparing a catalyst slurry composition comprising a platinum-coated carbon powder (Pt/C) catalyst, an ionomer and a solvent A; (b) stirring the catalyst slurry composition; (c) homogenizing the catalyst slurry composition gone through (b) by sonication treatment; (d) drying the catalyst slurry composition gone through (c) at a temperature of 30° C. to 100° C.; (e) adding a solvent B to the catalyst slurry composition gone through (d); (f) rehomogenizing the catalyst slurry composition gone through (e) by sonication treatment; and (g) forming a catalyst layer by coating the catalyst slurry composition gone through (f) on a substrate, drying the result, and then transferring the substrate on one surface or both surfaces of an electrolyte membrane.

Another embodiment of the present specification provides a membrane-electrode assembly manufactured using the method for manufacturing a membrane-electrode assembly.

Still another embodiment of the present specification provides a fuel cell comprising the membrane-electrode assembly.

Advantageous Effects

A method for manufacturing a membrane-electrode assembly according to one embodiment of the present specification is capable of enhancing ionomer dispersibility by adding a step of rehomogenizing through sonication treatment after adding a solvent B after drying a catalyst slurry composition.

In addition, by enhancing ionomer dispersibility, the method for manufacturing a membrane-electrode assembly according to one embodiment of the present specification is capable of reducing phenomena of ionomer agglomeration and cracks compared to existing manufacturing methods.

Furthermore, by reducing phenomena of ionomer agglomeration and cracks, the method for manufacturing a membrane-electrode assembly according to one embodiment of the present specification enhances an open circuit voltage (OCV) of a fuel cell by reducing fuel penetration, and is thereby capable of enhancing performance of the fuel cell.

REFERENCE NUMERAL

10: Electrolyte Membrane
20: Cathode Catalyst Layer
21: Anode Catalyst Layer
40: Cathode Gas Diffusion Layer
41: Anode Gas Diffusion Layer
50: Cathode
51: Anode

MODE FOR DISCLOSURE

In the present specification, a description of a certain part "comprising" certain constituents means capable of further including other constituents, and does not exclude other constituents unless particularly stated on the contrary.

Hereinafter, preferred embodiments of the present disclosure will be described. However, embodiments of the present disclosure may be modified to various different forms, and the scope of the present disclosure is not limited to the embodiments described below. In addition, embodiments of the present disclosure are provided in order to more fully describe the present disclosure to those having average knowledge in the art.

One embodiment of the present specification provides a method for manufacturing a membrane-electrode assembly (MEA) comprising (a) preparing a catalyst slurry composition comprising a platinum-coated carbon powder (Pt/C) catalyst, an ionomer and a solvent A; (b) stirring the catalyst slurry composition; (c) homogenizing the catalyst slurry composition gone through (b) by sonication treatment; (d) drying the catalyst slurry composition gone through (c) at a temperature of 30° C. to 100° C.; (e) adding a solvent B to the catalyst slurry composition gone through (d); (f) rehomogenizing the catalyst slurry composition gone through (e) by sonication treatment; and (g) forming a catalyst layer by coating the catalyst slurry composition gone through (f) on a substrate, drying the result, and then transferring the substrate on one surface or both surfaces of an electrolyte membrane.

In one embodiment of the present specification, the catalyst slurry composition of (a) comprises a platinum-coated carbon powder (Pt/C) catalyst, an ionomer and a solvent A.

In one embodiment of the present specification, the catalyst of (a) is a platinum-coated carbon powder (Pt/C).

In the present specification, as the catalyst of (a), a catalyst having a metal loaded on a carbon support surface may be used.

As the carbon support, although not limited thereto, one or a mixture of two or more selected from the group consisting of graphite, carbon black, acetylene black, denka black, ketjen black, active carbon, mesoporous carbon, carbon nanotubes, carbon nanofibers, carbon nanohorns, carbon nanorings, carbon nanowires, fullerene (C60) and super P may be used.

In the present specification, the Pt loading in the platinum-coated carbon powder (Pt/C) in the catalyst slurry composition of (a) is preferably from 10 wt % to 80 wt % with respect to the carbon, but is not limited thereto.

In one embodiment of the present specification, the ionomer of (a) is a fluorine-based polymer.

Specifically, the ionomer of (a) may perform a role of providing a path for ions produced from the reaction between fuel such as hydrogen or methanol and the catalyst to migrate to an electrolyte membrane.

In the present specification, the ionomer of (a) may be a perfluorosulfonic acid (PFSA)-based polymer or a perfluorocarboxylic acid (PFCA)-based polymer. As the perfluorosulfonic acid-based polymer, Nafion (Dupont Co.) may be used, and as the perfluorocarboxylic acid-based polymer, Flemion (Asahi Glass Co.) may be used.

According to one embodiment of the present specification, the ionomer of (a) may have a weight average molecular weight of 240 g/mol to 200,000 g/mol, and specifically 240 g/mol to 10,000 g/mol.

In the present specification, the content of the ionomer of (a) is preferably from 5 wt % to 150 wt % with respect to the carbon, but is not limited thereto.

In one embodiment of the present specification, the solvent A of (a) may be one, two or more selected from the group consisting of water, methanol, ethanol, butanol, 1-propanol and isopropanol. Preferably, the solvent A may be water or propanol, but is not limited thereto.

In one embodiment of the present specification, the solvent A of (a) is water.

In one embodiment of the present specification, the solvent A of (a) is 1-propanol.

In one embodiment of the present specification, the solvent A of (a) comprises water and 1-propanol.

In the present specification, the content of the solvent A of (a) is preferably from 10 wt % to 99 wt % with respect to the whole catalyst slurry composition, but is not limited thereto.

In the present specification, the solvent A of (a) is a solvent capable of dispersing a catalyst, and only solvents that evaporate in a 30° C. to 100° C. range may be used. Accordingly, water, or an alcohol-based solvent such as methanol, ethanol and propanol is suited.

In addition, it is not proper to use glycerol as the solvent A in (a) since glycerol is used for binding the MEA and maintaining a residual solvent. Besides, glycerol has a boiling point of 290° C., which is outside the proper temperature range as the solvent A, and therefore, it is not proper to use glycerol as the solvent A.

In one embodiment of the present specification, the catalyst slurry composition itself having a form of the catalyst and the ionomer dispersed in a solution maintains a precipitated state, and in order to maintain a stable dispersion state, stirring the catalyst slurry composition (b) is included.

When the catalyst slurry composition is in a precipitated state and does not form a stable dispersion state, the amount of catalyst distribution is different causing a difference in the catalyst amount and distribution in each part, and viscosity increases inconsistently due to aggregation of particles sunk at the bottom making it difficult to obtain constant properties. However, through the stirring, catalyst particle distribution becomes relatively narrow preventing particle aggregation, and dispersion of the catalyst slurry may be maintained to be form.

In one embodiment of the present specification, the catalyst slurry composition gone through (b) is sonication treated to be homogenized in (c).

In the present specification, the sonication treatment of (c) may be carried out in a tip type or a bath type.

In the present specification, the sonication treatment means an act of dispersion by applying energy with a frequency of 20 kHz or higher on particles, and the bath type uses energy of relatively low and constant magnitude, and the tip type may variably apply high energy of approximately 50 times greater than the bath type.

Generally, ionomers aggregate with each other by electrostatic attraction in a solvent and are present as an aggregate having a particle diameter of 0.01 μm to 1 μm, and a unit particle formed by such ionomer aggregation in a solvent is referred to as an ionomer cluster. When dispersing these through sonication treatment, specifically, through the tip type or bath type sonication treatment, most of the ionomer cluster are uniformly dispersed to have an average particle diameter of 10 nm to 500 nm and preferably 10 nm to 300 nm.

The tip type sonication treatment may be performed for, although not limited thereto, 10 minutes to 30 minutes. The bath type sonication treatment may be performed for 20 minutes to 120 minutes and preferably for 30 minutes to 60 minutes.

When the sonication treatment is performed within the above-mentioned time range, an occurrence of local ionomer aggregation may be prevented. The sonication treatment being performed longer than the above-mentioned time range may be inefficient since a dispersion effect is not great considering time.

In order to form a catalyst layer having a uniform structure, sufficient adsorption capacity between the ionomer and the carbon support in the catalyst is important, and when adjusting ionomer particle diameters to be small through such sonication treatment, the ionomer may be uniformly adsorbed to the carbon support in the catalyst.

In one embodiment of the present specification, the catalyst slurry composition gone through (c) is dried at a temperature of 30° C. to 100° C. in (d). More preferably, the catalyst slurry composition gone through (c) may be dried at a temperature of 40° C. to 70° C. The temperature of 30° C. or lower is not proper since the drying speed is low leading to a possibility of separating the ionomer and the catalyst again, and the temperature of 100° C. or higher may cause a problem of catalyst ignition when the solvent A is an alcohol-based solvent.

In one embodiment of the present specification, to the catalyst slurry composition gone through (d), a solvent B is added in (e).

In one embodiment of the present specification, the solvent B of (e) may be one, two or more selected from the group consisting of water, methanol, ethanol, butanol, 1-propanol, isopropanol, n-butyl acetate, ethylene glycol and glycerol. Preferably, the solvent B may be glycerol, but is not limited thereto.

In one embodiment of the present specification, the solvent B of (e) is glycerol.

In one embodiment of the present specification, the solvent B of (e) is glycerol and 1-propanol.

In one embodiment of the present specification, the solvent B of (e) comprises glycerol, water and 1-propanol.

In the present specification, the content of the solvent B of (e) is preferably from 10 wt % to 99 wt % with respect to the whole catalyst slurry composition, but is not limited thereto.

In one embodiment of the present specification, the catalyst slurry composition gone through (e) is homogenized by sonication treatment in (f).

In the present specification, the sonication treatment of (f) may be the same as the process of sonication treatment of (c).

In one embodiment of the present specification, the catalyst slurry composition gone through (f) is coated on a substrate and dried, and the substrate is transferred on one surface or both surfaces of an electrolyte membrane to form a catalyst layer in (g).

In the present specification, the coating of (g) may be carried out through one method selected from the group consisting of a spray coating method, a screen printing method, a tape casting method, a brushing method, a slot die casting method, a bar-casting method and inkjetting.

In one embodiment of the present specification, the catalyst layer formed in (g) has a thickness of 5 μm to 15 μm. The membrane-electrode assembly may further comprise a cathode gas diffusion layer provided on a surface of the cathode catalyst layer opposite to the surface provided with the electrolyte membrane, and an anode gas diffusion layer provided on a surface of the anode catalyst layer opposite to the surface provided with the electrolyte membrane.

The anode gas diffusion layer and the cathode gas diffusion layer are each provided on one surface of the catalyst layer, become a migration path of reaction gases and water together with a role as a current conductor, and have a porous structure.

The gas diffusion layer is generally not particularly limited as long as it is a substrate having conductivity and porosity of 80% or greater, and may be formed comprising a conductive base selected from the group consisting of carbon paper, carbon cloth and carbon felt. The substrate may have a thickness of 30 μm to 500 μm. When the thickness is within the above-mentioned range, a balance between mechanical strength and diffusivity of gas and water may be properly controlled. The gas diffusion layer may be formed further comprising a micropore layer formed on one surface of the conductive substrate, and the micropore layer may be formed comprising a carbon-based material and a fluorine-based resin. The micropore layer may suppress the occurrence of flooding by facilitating discharge of excess water present in the catalyst layer.

As the carbon-based material, although not limited thereto, one or a mixture of two or more selected from the group consisting of graphite, carbon black, acetylene black, denka black, ketjen black, active carbon, mesoporous carbon, carbon nanotube, carbon nanofiber, carbon nanohorn, carbon nanoring, carbon nanowire, fullerene (C60) and super P may be used.

As the fluorine-based resin, although not limited thereto, one or a mixture of two or more selected from the group consisting of polytetrafluoroethylene, polyvinylidene fluoride (PVdF), polyvinyl alcohol, cellulose acetate, polyvinylidene fluoride-hexafluoropropylene copolymer (PVdF-HFP) and styrene-butadiene rubber (SBR) may be used.

Figure 1:
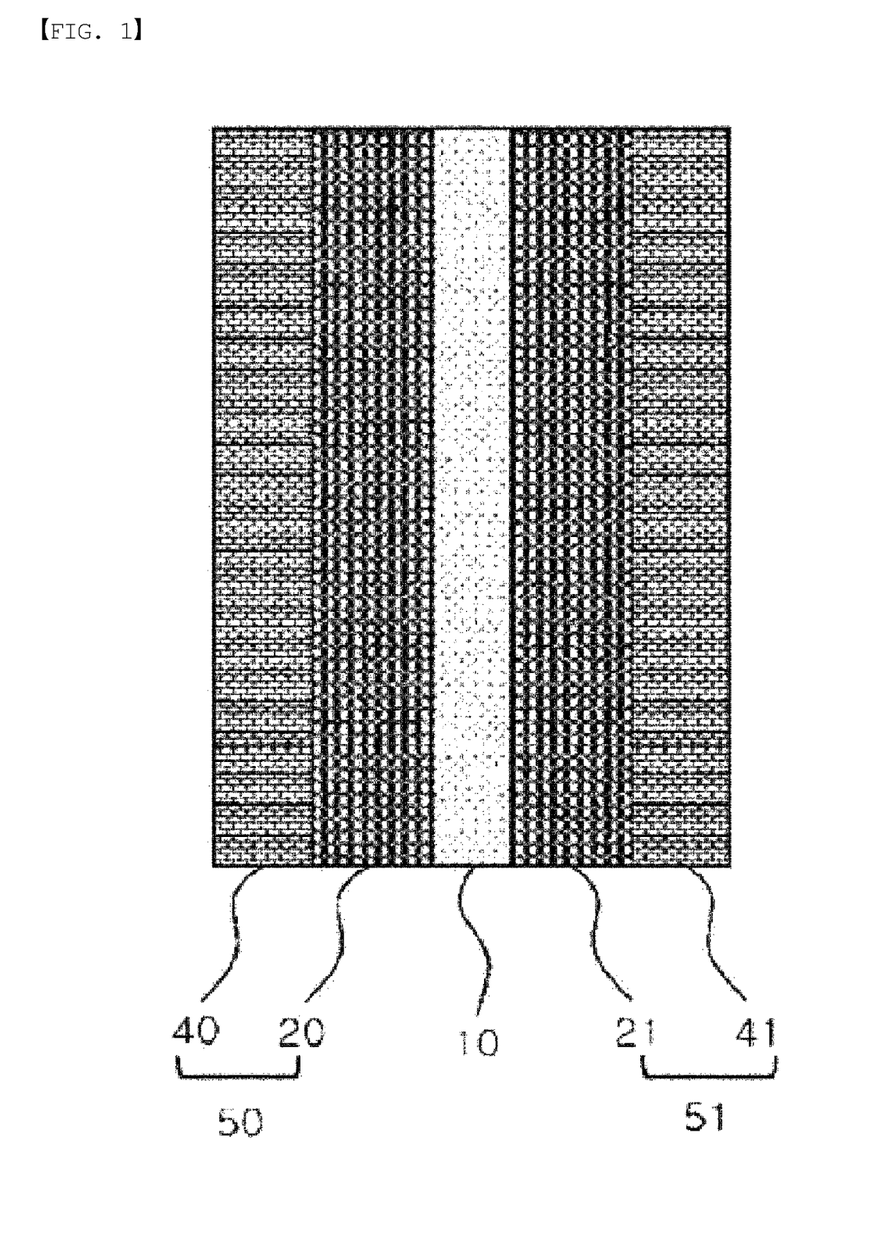
FIG. 1 is a diagram schematically illustrating a structure of a membrane-electrode assembly.
Figure 2:
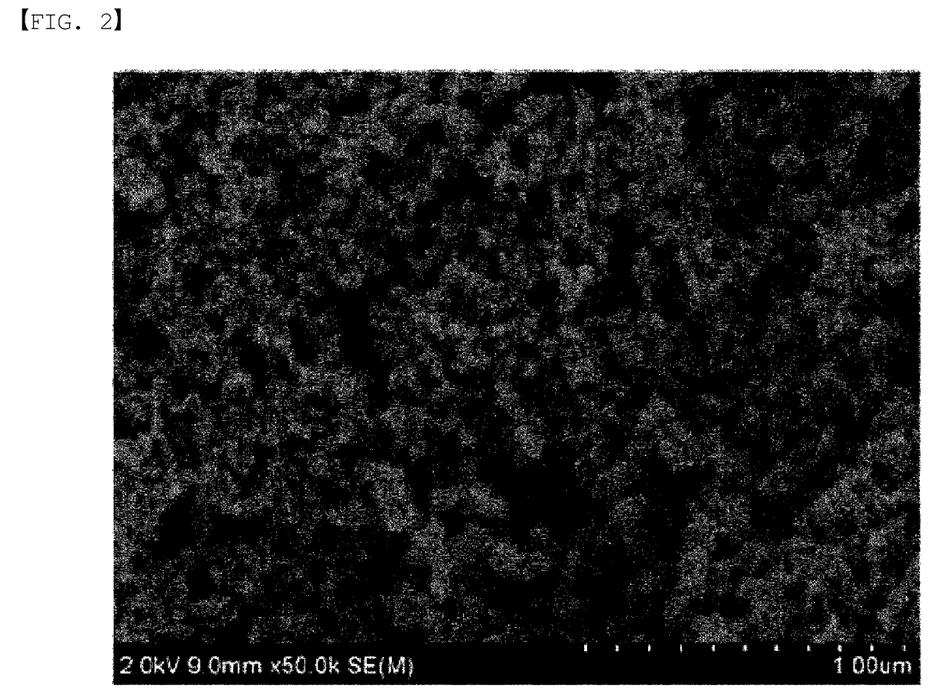
FIGS. 2 and 3 show SEM images of a catalyst layer prepared using a method for manufacturing a membrane-electrode assembly according to Example 1 of the present specification.
Figure 3:
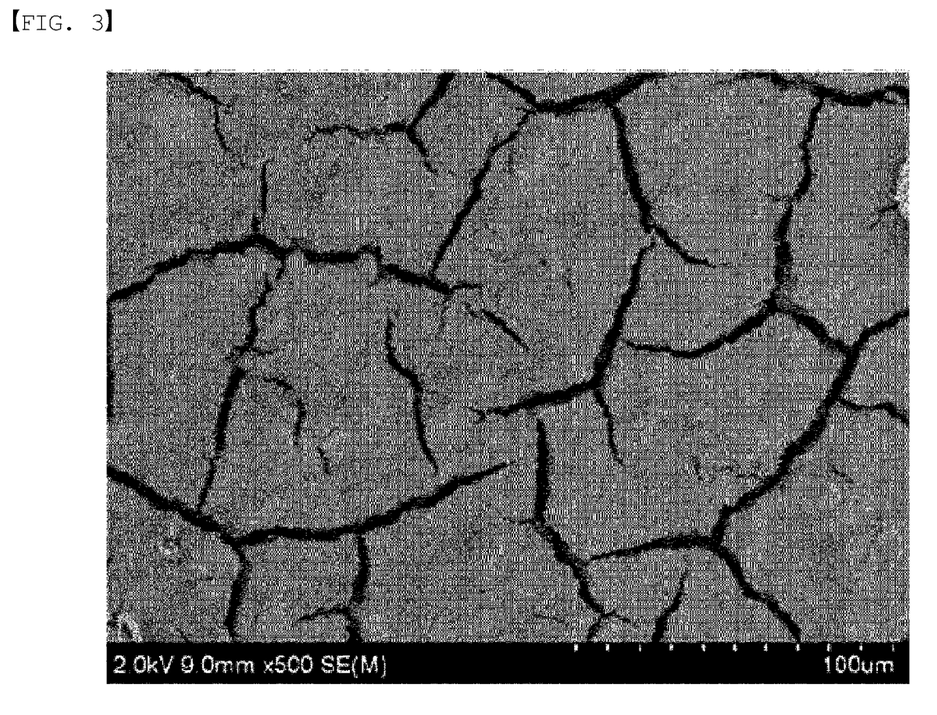
Figure 4:
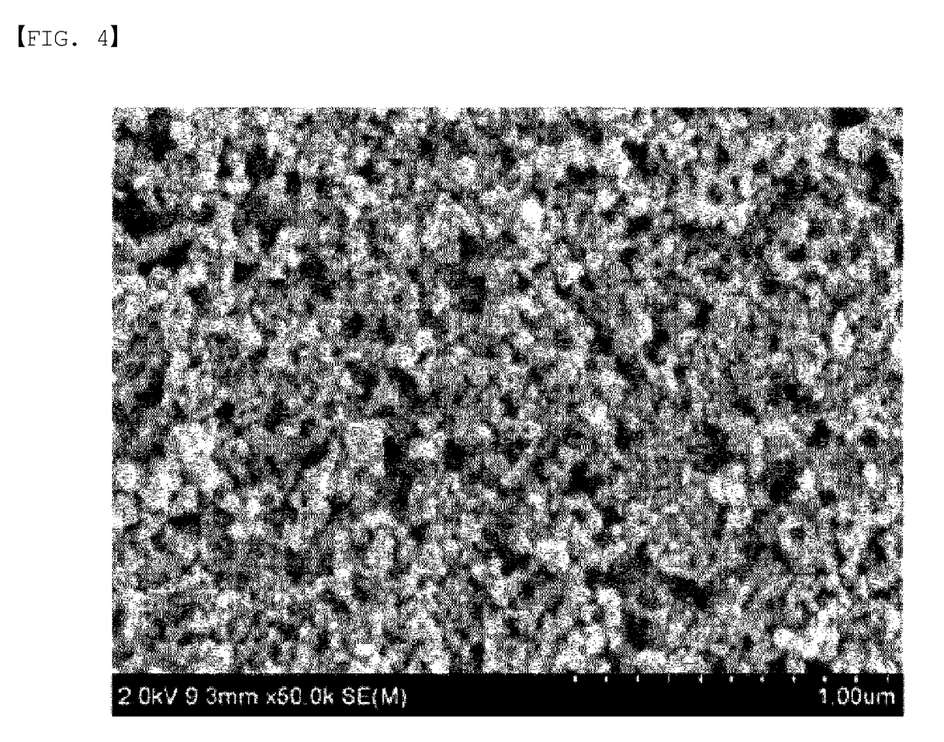
FIGS. 4 and 5 show SEM images of a catalyst layer prepared using a method for manufacturing a membrane-electrode assembly according to Comparative Example 1 of the present specification.
Figure 5:
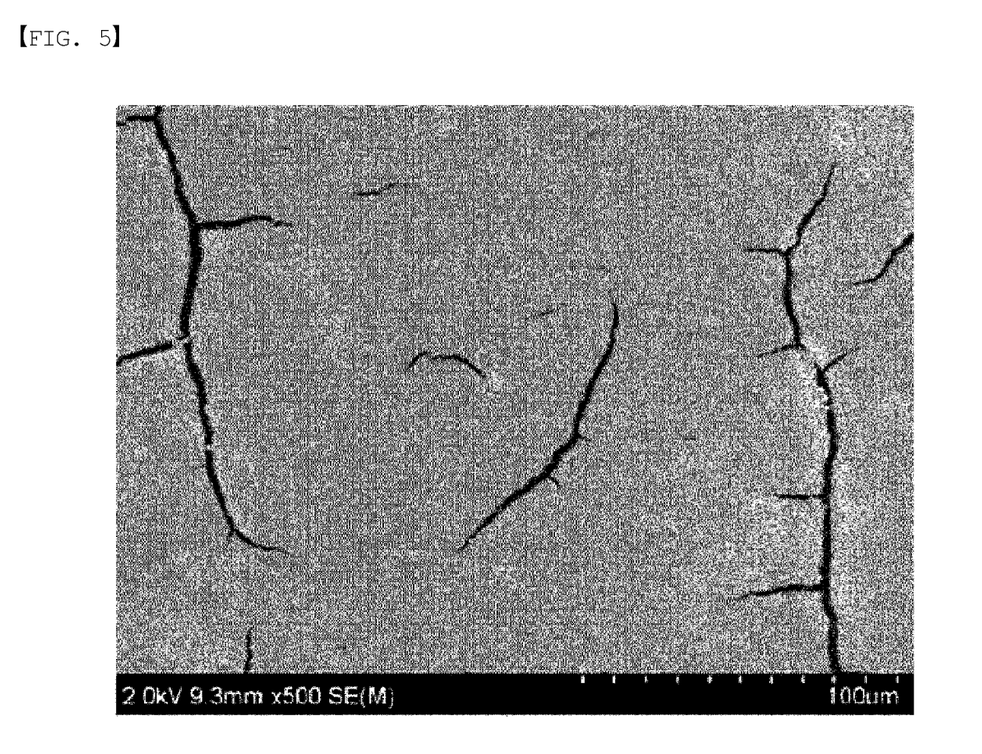
Figure 6:
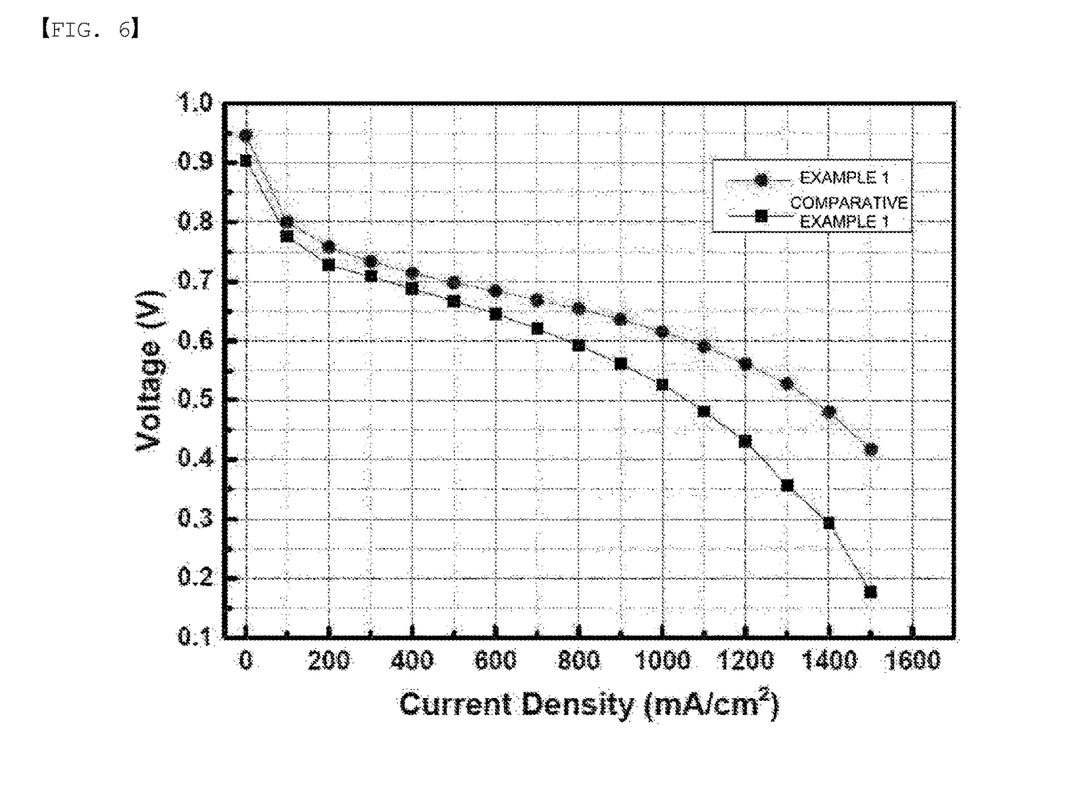
FIG. 6 shows results of measuring performance when using catalyst layers prepared using methods for manufacturing a membrane-electrode assembly according to Example 1 and Comparative Example 1 of the present specification in both a cathode and an anode.
Figure 7:
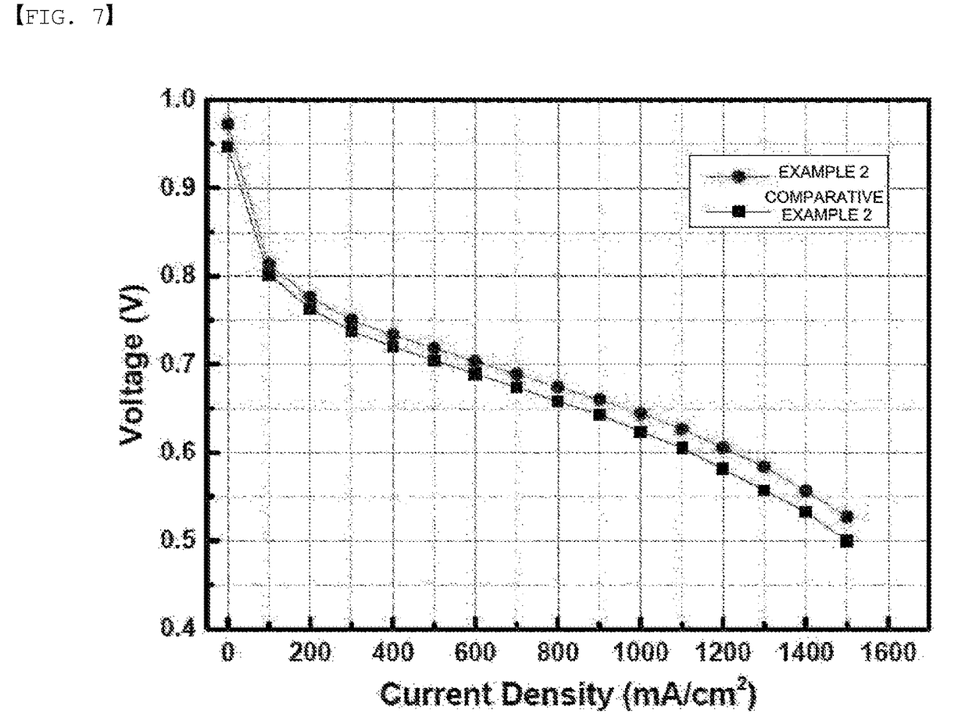
FIG. 7 shows results of measuring performance when using catalyst layers prepared using methods for manufacturing a membrane-electrode assembly according to Example 2 and Comparative Example 2 of the present specification in only a cathode.

FIG. 1 is a diagram schematically illustrating a structure of a membrane-electrode assembly, and the membrane-electrode assembly may be provided with an electrolyte membrane (10), and a cathode (50) and an anode (51) located to face each other with this electrolyte membrane (10) therebetween. Specifically, the cathode may comprise a cathode catalyst layer (20) and a cathode gas diffusion layer (40) consecutively provided from the electrolyte membrane (10), and the anode may comprise an anode catalyst layer (21) and an anode gas diffusion layer (41) consecutively provided from the electrolyte membrane (10).

In addition, one embodiment of the present specification provides a membrane-electrode assembly manufactured using the method for manufacturing a membrane-electrode assembly.

Furthermore, one embodiment of the present specification provides a fuel cell comprising the membrane-electrode assembly.

MODE FOR INVENTION

Hereinafter, the present specification will be described in detail with reference to examples in order to specifically describe the present specification. However, examples according to the present specification may be modified to various different forms, and the scope of the present specification is not construed as being limited to the examples described below. Examples of the present specification are provided in order to more fully describe the present specification to those having average knowledge in the art.

EXAMPLE

Example 1

A 3 M 825 ionomer was added to a solution mixing water and 1-propanol in a 7:3 ratio. After that, a TEC 10F50E catalyst sold by Tanaka Co., Ltd. was added thereto at an ionomer and carbon (ionomer/carbon) mass ratio of 0.9. The result was stirred for 1 hour at room temperature using a magnetic stirrer, then dispersed using a bath-type ultrasonic homogenizer for 1 hour at room temperature, and then dispersed for 15 minutes using a tip-type ultrasonic homogenizer after the temperature was lowered to 50° C. or lower. Then, the result was dried in a 70° C. oven to obtain ionomer-dispersed catalyst particles in a solid state.

After adding these particles to a solution mixing 1-propanol and glycerol, the result was ultrasonic dispersed as above to prepare electrode slurry.

Using the prepared electrode slurry, an electrode catalyst layer was casted on a PTFE film using a doctor blade on a horizontal plate of an applicator in a clean bench, and then the result was dried for 30 minutes at 35° C., and 30 minutes at 140° C. to finally manufacture an electrode.

Example 2

An electrode was manufactured in the same manner as in Example 1 except that a TEC 10F50E-HT catalyst sold by Tanaka Co., Ltd. was used as the catalyst.

Comparative Example 1

A 3 M 825 ionomer was added to a solution mixing 1-propanol and glycerol. After that, a TEC 10F50E catalyst sold by Tanaka Co., Ltd. was added thereto at an ionomer and carbon mass ratio of 0.9. After that, electrode slurry was prepared through stirring and ultrasonic dispersion in the same manner as in Example 1, and an electrode was manufactured in the same manner as in Example 1.

Comparative Example 2

An electrode was manufactured in the same manner as in Comparative Example 1 except that a TEC 10F50E-HT catalyst sold by Tanaka Co., Ltd. was used as the catalyst.

Experimental Example 1

Evaluation on membrane-electrode assemblies using the electrode catalyst layers of Example 1 and Comparative Example 1 was progressed. A sPEEK-based hydrocarbon-based membrane was used as the electrolyte membrane, 10BB manufactured by SGL Group was used as a gas diffusion layer (GDL), and one having a thickness range of 380 µm to 420 µm was used. The compressibility of the GDL was set at 25%, and a glass fiber sheet was used for maintaining the compressibility. The active area of the membrane-electrode assembly was prepared to be 25 cm² to progress the evaluation on the unit battery cell. As an anode and a cathode, the electrodes of the same example were used for the evaluation.

As the evaluation apparatus, a PEMFC station apparatus manufactured by Scribner Associates Inc. was used, and the cell temperature was maintained at 70° C. and humidity condition was maintained at RH 50% to proceed with the performance evaluation. The results are shown in the following Table 1 and FIGS. 2 to 6.

TABLE 1

| | OCV (V) | Performance (@0.6 V) (mA/cm²) |
|---|---|---|
| Comparative Example 1 | 0.904 | 773 |
| Example 1 | 0.946 | 1,064 |

Experimental Example 2

Evaluation on membrane-electrode assemblies using the electrode catalyst layers of Example 2 and Comparative Example 2 was progressed. As an anode, the electrode manufactured using the manufacturing method of Comparative Example 1 using the TEC 10V50E catalyst sold by Tanaka Co., Ltd. was used in the same manner, and the electrode of the corresponding example was used only in a cathode. Other experimental methods were the same as in Example 1.

TABLE 2

| | OCV (V) | Performance (@0.6 V) (mA/cm²) |
|---|---|---|
| Comparative Example 2 | 0.946 | 1,123 |
| Example 2 | 0.972 | 1,227 |

In Experimental Example 1, the 10F50E catalyst was used in both the anode and the cathode, and in Experimental Example 2, the 10F50E-HT catalyst was used only in the cathode, and the 10V50E catalyst was used in the anode.

As seen from Table 1, Table 2 and FIGS. 2 to 6, it was identified that the electrodes manufactured using the method for manufacturing a membrane-electrode assembly of the present specification had reduced ionomer aggregation compared to Comparative Examples 1 and 2 in the art, and performance of a fuel cell was enhanced with an enhanced open circuit voltage (OCV) of the fuel cell.

The invention claimed is:

1. A method for manufacturing a membrane-electrode assembly (MEA) comprising:
   (a) preparing a catalyst slurry composition including a platinum-coated carbon powder (Pt/C) catalyst, an ionomer and a solvent A,
   wherein solvent A does not comprise glycerol and the solvent (A) evaporates between 30° C. and 100° C.

(b) stirring the catalyst slurry composition;
(c) homogenizing the catalyst slurry composition gone through (b) by sonication treatment;
(d) drying the catalyst slurry composition gone through (c) at a temperature of 30° C. to 100° C.;
(e) adding a solvent B to the catalyst slurry composition gone through (d),
wherein solvent B comprises glycerol;
(f) rehomogenizing the catalyst slurry composition gone through (e) by sonication treatment; and
(g) forming a catalyst layer by coating the catalyst slurry composition gone through (f) on a substrate, drying the result, and then transferring the dried catalyst slurry composition on one surface or both surfaces of an electrolyte membrane while the dried catalyst slurry composition is on the substrate.

2. The method for manufacturing a membrane-electrode assembly of claim 1, wherein the ionomer of (a) is a fluorine-based polymer.

3. The method for manufacturing a membrane-electrode assembly of claim 1, wherein the solvent A of (a) comprises one or more selected from the group consisting of water, methanol, ethanol, butanol, 1-propanol and isopropanol.

4. The method for manufacturing a membrane-electrode assembly of claim 1, wherein the solvent B of (e) further comprises one or more selected from the group consisting of water, methanol, ethanol, butanol, 1-propanol, isopropanol, n-butyl acetate, and ethylene glycol.

5. The method for manufacturing a membrane-electrode assembly of claim 1, wherein the coating of (g) is carried out through one method selected from the group consisting of a spray coating method, a screen printing method, a tape casting method, a brushing method, a slot die casting method, a bar-casting method and inkjetting.

6. The method for manufacturing a membrane-electrode assembly of claim 1, wherein the catalyst layer of (g) has a thickness of 5 µm to 15 µm.

* * * * *